United States Patent
Kruger

(10) Patent No.: US 9,445,199 B2
(45) Date of Patent: Sep. 13, 2016

(54) METHOD AND APPARATUS FOR DETERMINING DOMINANT SOUND SOURCE DIRECTIONS IN A HIGHER ORDER AMBISONICS REPRESENTATION OF A SOUND FIELD

(71) Applicant: THOMSON LICENSING, Issy de Moulineaux (FR)

(72) Inventor: Alexander Kruger, Hannover (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/648,208

(22) PCT Filed: Nov. 18, 2013

(86) PCT No.: PCT/EP2013/074039
§ 371 (c)(1),
(2) Date: May 28, 2015

(87) PCT Pub. No.: WO2014/082883
PCT Pub. Date: Jun. 5, 2014

(65) Prior Publication Data
US 2015/0312678 A1    Oct. 29, 2015

(30) Foreign Application Priority Data
Nov. 29, 2012   (EP) .................................... 12306485

(51) Int. Cl.
*H04R 5/04* (2006.01)
*H04S 7/00* (2006.01)
(Continued)

(52) U.S. Cl.
CPC ................ *H04R 5/04* (2013.01); *G01S 3/801* (2013.01); *G01S 3/8006* (2013.01); *H04H 20/89* (2013.01);
(Continued)

(58) Field of Classification Search
CPC ..... H04R 5/04; H04S 7/302; H04S 2420/11; H04S 5/00; H04S 3/00
USPC ....... 381/303, 17, 22, 23, 26, 310, 309, 307, 381/300
See application file for complete search history.

(56) References Cited

U.S. PATENT DOCUMENTS

| 6,259,795 B1 | 7/2001 | McGrath |
| 8,705,750 B2 * | 4/2014 | Berge ..................... H04R 3/12 381/103 |

(Continued)

FOREIGN PATENT DOCUMENTS

| EP | WO2009046223 | 4/2009 |
| EP | 2469741 | 6/2012 |

(Continued)

OTHER PUBLICATIONS

Sinah et al: "The perceptual audio coder (PAC)", Handbook for digital signal processing, Jan. 1, 1998, pp. 42-1 to 42-18.
(Continued)

*Primary Examiner* — Thjuan K Addy

(57) ABSTRACT

In Higher Order Ambisonics, a problem is the tracking of time variant directions of dominant sound sources. The following processing is carried out: from a current time frame of HOA coefficients, estimating a directional power distribution of dominant sound sources, from said directional power distribution and from an a-priori probability function for dominant sound source directions, computing an a-posteriori probability function for said dominant sound source directions, depending on said a-posteriori probability function and on dominant sound source directions for the previous time frame, searching and assigning dominant sound source directions for said current time frame of said HOA coefficients.

14 Claims, 3 Drawing Sheets

Figure 1:
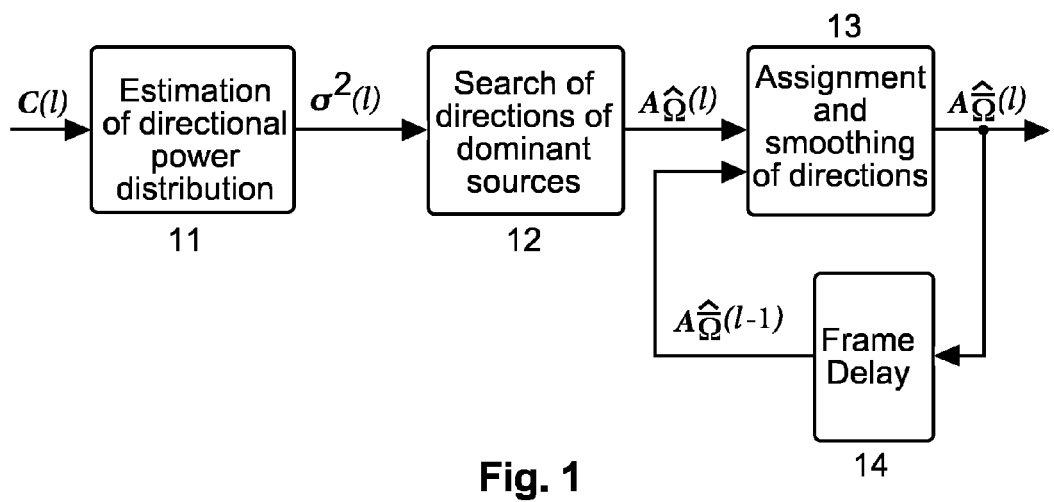

(51) Int. Cl.
- *H04S 5/00* (2006.01)
- *H04R 5/00* (2006.01)
- *H04S 3/00* (2006.01)
- *G10L 19/008* (2013.01)
- *H04H 20/89* (2008.01)
- *G01S 3/80* (2006.01)
- *G01S 3/801* (2006.01)

(52) U.S. Cl.
CPC ............... *H04S 3/002* (2013.01); *H04S 7/302* (2013.01); *G10L 19/008* (2013.01); *H04S 2400/11* (2013.01); *H04S 2420/11* (2013.01)

(56) References Cited

U.S. PATENT DOCUMENTS

2012/0155653 A1* 6/2012 Jax .................. G10L 19/008
　　　　　　　　　　　　　　　　　　　　381/22
2015/0294672 A1* 10/2015 Batke ................ G10L 19/008
　　　　　　　　　　　　　　　　　　　　381/22

FOREIGN PATENT DOCUMENTS

| EP | 2665208 | 11/2013 |
| WO | WO0019415 | 4/2000 |

OTHER PUBLICATIONS

Kuhn: "The Hungarian method for the assignment problem"; Naval research logistics, Quarterly 2, 1955, Nr. 1-2, p. 83-97.
Seon: "Smoothing of an all-sky-survy map with Fisher-von Mises function", J Korean Phys Soc, 2007; pp. 1-4.
Search Report Dated Dec. 17, 2013.

* cited by examiner

METHOD AND APPARATUS FOR DETERMINING DOMINANT SOUND SOURCE DIRECTIONS IN A HIGHER ORDER AMBISONICS REPRESENTATION OF A SOUND FIELD

This application claims the benefit, under 35 U.S.C. §365 of International Application PCT/EP2013/074039, filed Nov. 18, 2013, which was published in accordance with PCT Article 21(2) on Jun. 5, 2014 in English and which claims the benefit of European patent application No. 12306485.9, filed Nov. 29, 2012.

The invention relates to a method and to an apparatus for determining dominant sound source directions in a Higher Order Ambisonics representation of a sound field.

BACKGROUND

Higher Order Ambisonics (HOA) is a representation of the acoustic pressure of a sound field within the vicinity of the origin of a virtual coordinate system in the three dimensional space, which is called the sweet spot. Such HOA representation is independent of a specific loudspeaker set-up, in contrast to channel-based techniques like stereo or surround. But this flexibility is at the expense of a decoding process required for playback of the HOA representation on a particular loudspeaker set-up.

A sound field is generated in a room or in the outside by one or more sound sources: e.g. by a single voice or music instrument, or by an orchestra, or by any noise producers like traffic and/or trees in the wind. As soon as any sound waves are generated, a sound field will be produced.

HOA is based on the description of the complex amplitudes of the air pressure for individual angular wave numbers for positions in the vicinity of a desired listener position, using a truncated Spherical Harmonics expansion. The spatial resolution of this representation improves with a growing maximum order N of the expansion.

A problem is the tracking of the time variant directions (with respect to the coordinate origin) of the dominant sound sources. Such a problem arises for example in the context of the compression of an HOA representation based on its decomposition into a directional and an ambient component, which processing has been described in patent application EP 12305537.8.

It is assumed that from the HOA representation a temporal sequence of spherical likelihood functions is computed that provides the likelihood for the occurrence of dominant sound sources at a high number of predefined directions. Such a likelihood function can be the directional power distribution of the dominant sources, cf. EP 12305537.8.

Then the problem to be solved is determining from the spherical likelihood functions a number of temporal sequences of direction estimates related to the dominant sound sources, which can be used to extract the directional component from the HOA sound field representation. The particular challenges of this problem are two-fold: to provide relatively smooth temporal trajectories of direction estimates, i.e. to avoid outliers in the direction trajectories, which might occur due to direction estimation errors, and to accurately capture abrupt direction changes or directions related to onsets of new directional signals.

In EP 12305537.8 an estimation of temporal sequences of direction estimates related to the dominant sound sources is described. Its principle is illustrated in FIG. 1. The processing starts in step or stage 11 with estimating from a time frame $C(l)$ of HOA coefficients a directional power distribution $\sigma^2(l)$ with respect to the dominant sound sources, where $l \in \mathbb{N}$ denotes the frame index. From $\sigma^2(l)$, the directional power distribution is computed for a predefined number of Q discrete test directions $\Omega_q$, $q=1, \ldots, Q$, which are nearly equally distributed on the unit sphere. Each test direction $\Omega_q$ is defined as a vector containing an inclination angle $\theta_q \in [0,\pi]$ and an azimuth angle $\phi_q \in [0,2\pi]$ according to $$\Omega_q := (\theta_q, \phi_q)^T. \qquad (1)$$

The directional power distribution is represented by the vector $$\sigma^2(l) := (\sigma^2(l,\Omega_1), \ldots, \sigma^2(l,\Omega_Q))^T, \qquad (2)$$

whose components $\sigma^2(l,\Omega_q)$ denote the joint power of all dominant sound sources related to the direction $\Omega_q$ for the l-th time frame.

Figure 2:
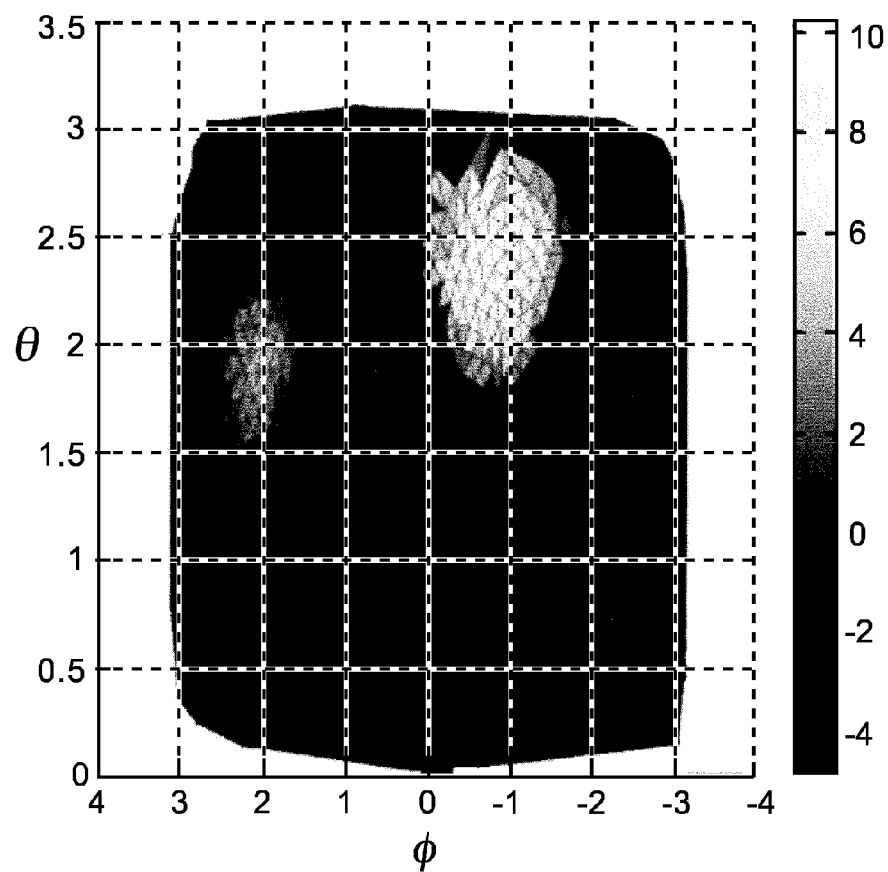

An example of a directional power distribution resulting from two sound sources obtained from an HOA representation of order 4 is illustrated in FIG. 2, where the unit sphere is unrolled so as to represent the inclination angle $\theta$ on the y-axis and the azimuth angle $\phi$ on the x-axis. The brightness indicates the power on a logarithmic scale (i.e. in dB). Note the spatial power dispersion (i.e. the limited spatial resolution) resulting from a limited order of 4 of the underlying HOA representation.

Depending on the estimated directional power distribution $\sigma^2(l)$ of the dominant sound sources, in FIG. 1 a predefined number D of dominant sound source directions $\hat{\Omega}_{DOM,1}(l), \ldots, \hat{\Omega}_{DOM,D}(l)$ are computed in step/stage 12, which are arranged in the matrix $A_{\hat{\Omega}}(l)$ as $$A_{\hat{\Omega}}(l) := [\hat{\Omega}_{DOM,1}(l) \ldots \hat{\Omega}_{DOM,D}(l)]. \qquad (3)$$

Thereafter in step/stage 13 the estimated directions $\hat{\Omega}_{DOM,d}(l)$, $d=1, \ldots, D$, are assigned to the appropriate smoothed directions $\bar{\Omega}_{DOM,d}(l-1)$ from the previous frame, and are smoothed with them in order to obtain the smoothed directions $\bar{\Omega}_{DOM,d}(l)$. The smoothed directions $\bar{\Omega}_{DOM,d}(l-1)$ from the previous frame are determined from matrix $A_{\bar{\Omega}}(l-1)$ output from HOA coefficient frame delay 14 that receives $A_{\bar{\Omega}}(l)$ at its input. Such smoothing is accomplished by computing the exponentially-weighted moving average with a constant smoothing factor. The smoothed directions are arranged in the matrix $A_{\bar{\Omega}}(l)$ output from step/stage 13 as follows:

$$A_{\bar{\Omega}}(l) := [\bar{\Omega}_{DOM,1}(l) \ldots \bar{\Omega}_{DOM,D}(l)]. \qquad (4)$$

EP 2469741 A1 describes a method for compression of HOA presentations by using a transformation into signals of general plane waves which are coming from pre-defined directions.

Invention

The major problem with this processing is that, due to the constant smoothing factor, it is not possible to capture accurately abrupt direction changes or onsets of new dominant sounds. Although a possible option would be to employ an adaptive smoothing factor, a major remaining problem is how to adapt the factor exactly.

A problem to be solved by the invention is to determine from spherical likelihood functions temporal sequences of direction estimates related to dominant sound sources, which can be used for extracting the directional component from a HOA sound field representation. This problem is solved by the method disclosed in claim 1. An apparatus that utilises this method is disclosed in claim 2.

The invention improves the robustness of the direction tracking of multiple dominant sound sources for a Higher Order Ambisonics representation of the sound field. In particular, it provides smooth trajectories of direction estimates and contributes to the accurate capture of abrupt direction changes or directions related to onsets of new directional signals.

"Dominant" means that (for a short period of time) the respective sound source contributes to the total sound field by creating a general acoustic plane with high power from the direction of arrival. That is why for the direction tracking the directional power distribution of the total sound field is analysed.

More general, the invention can be used for tracking arbitrary objects (not necessarily sound sources) for which a directional likelihood function is available.

The invention overcomes the two above-mentioned problems: it provides relatively smooth temporal trajectories of direction estimates and it is able to capture abrupt direction changes or onsets of new directional signals. The invention uses a simple source movement prediction model and combines its information with the temporal sequence of spherical likelihood functions by applying the Bayesian learning principle.

In principle, the inventive method is suited for determining dominant sound source directions in a Higher Order Ambisonics representation denoted HOA of a sound field, said method including the steps:
from a current time frame of HOA coefficients, estimating a directional power distribution with respect to dominant sound sources;
from said directional power distribution and from an a-priori probability function for dominant sound source directions, computing an a-posteriori probability function for said dominant sound source directions;
depending on said a-posteriori probability function and on dominant sound source directions for the previous time frame of said HOA coefficients, searching and assigning dominant sound source directions for said current time frame of said HOA coefficients,
wherein said a-priori probability function is computed from a set of estimated sound source movement angles and from said dominant sound source directions for the previous time frame of said HOA coefficients,
and wherein said set of estimated sound source movement angles is computed from said dominant sound source directions for the previous time frame of said HOA coefficients and from dominant sound source directions for the penultimate time frame of said HOA coefficients.

In principle the inventive apparatus is suited for determining dominant sound source directions in a Higher Order Ambisonics representation denoted HOA of a sound field, said apparatus including:
means being adapted for estimating from a current time frame of HOA coefficients a directional power distribution with respect to dominant sound sources;
means being adapted for computing from said directional power distribution and from an a-priori probability function for dominant sound source directions an a-posteriori probability function for said dominant sound source directions;
means being adapted for searching and assigning, depending on said a-posteriori probability function and on dominant sound source directions for the previous time frame of said HOA coefficients, dominant sound source directions for said current time frame of said HOA coefficients;
means being adapted for computing said a-priori probability function from a set of estimated sound source movement angles and from said dominant sound source directions for the previous time frame of said HOA coefficients;
means being adapted for computing said set of estimated sound source movement angles from said dominant sound source directions for the previous time frame of said HOA coefficients and from dominant sound source directions for the penultimate time frame of said HOA coefficients.

Advantageous additional embodiments of the invention are disclosed in the respective dependent claims.

DRAWINGS

Figure 3:
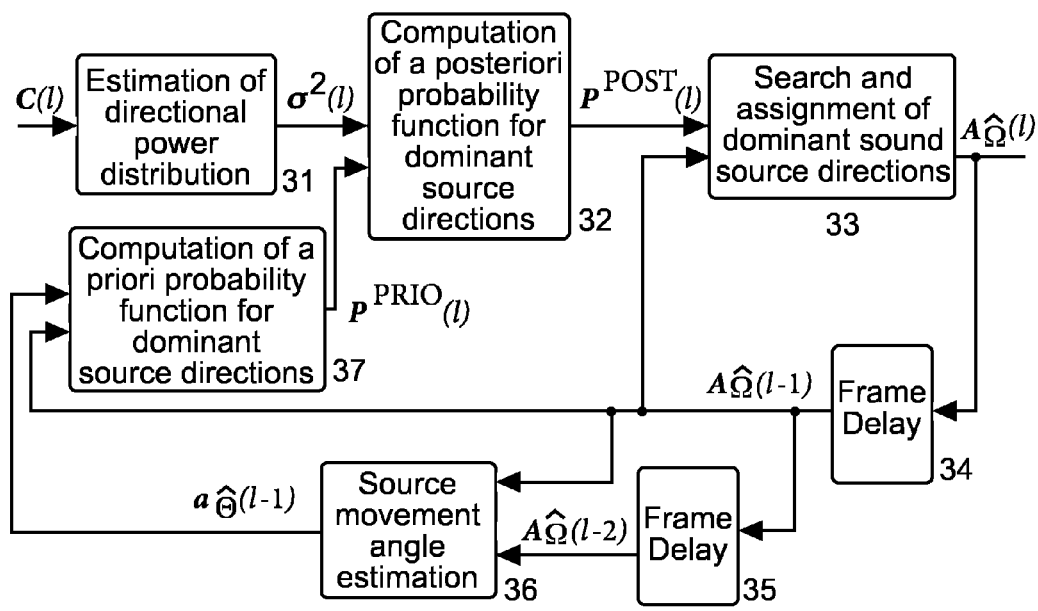

Exemplary embodiments of the invention are described with reference to the accompanying drawings, which show in:

FIG. 1 known estimation of dominant source directions for HOA signals;

FIG. 2 exemplary power distribution on the sphere resulting from two sound sources obtained from an HOA representation of order 4;

FIG. 3 basic block diagram of the inventive direction estimation processing.

Figure 4:
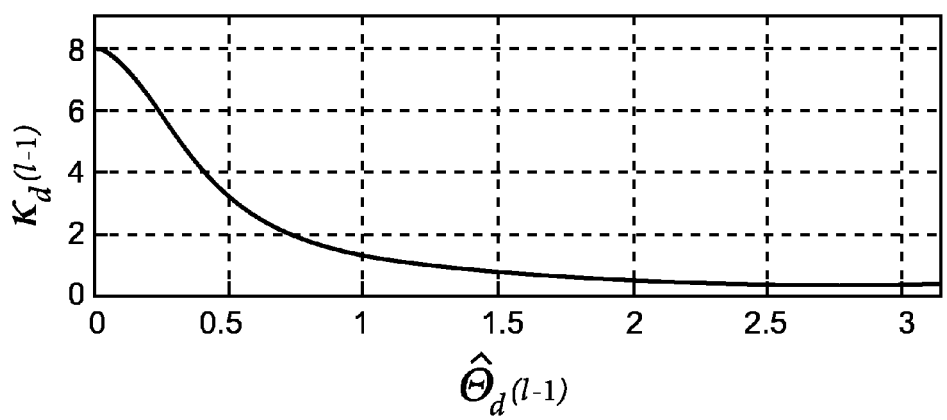
Figure 5:
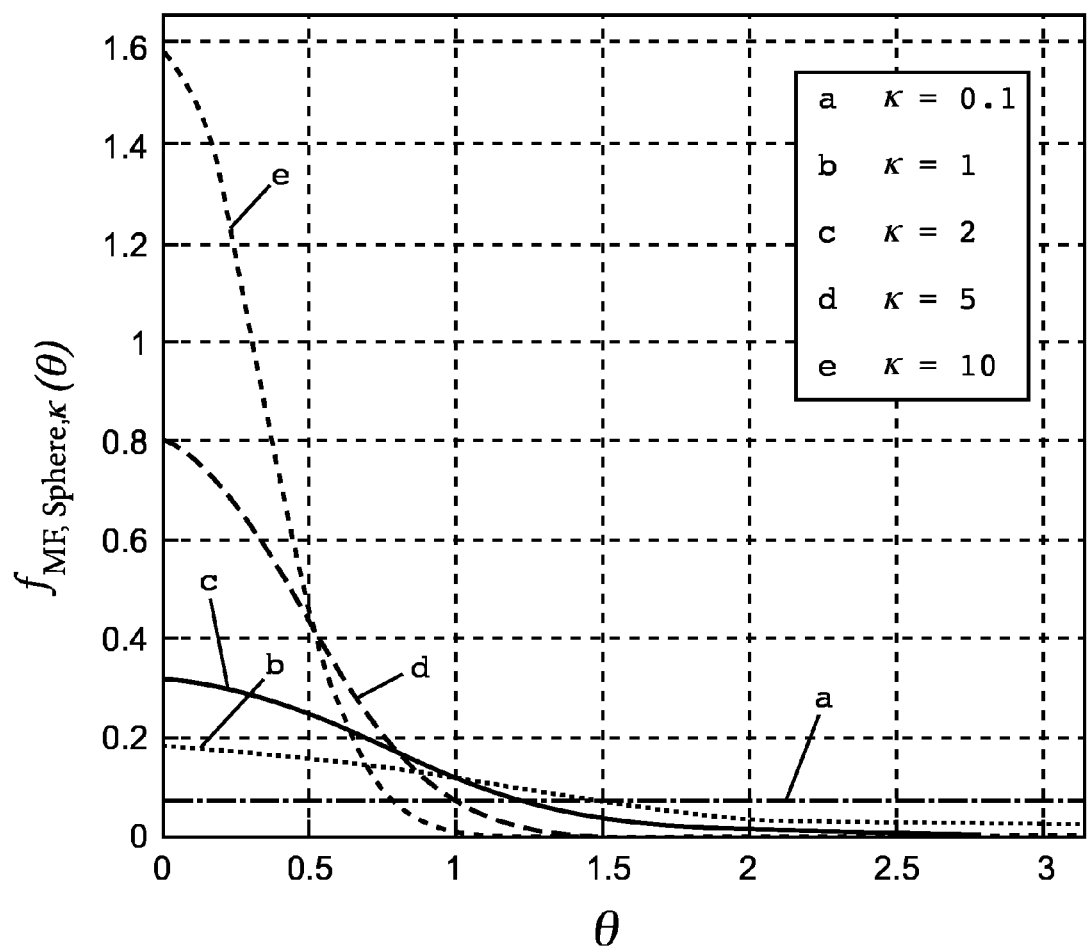

FIG. 4 a relationship between a concentration parameter and a source movement angle in accordance with various embodiments;

FIG. 5 a shape of a von Mises-Fisher distribution around a mean direction.

EXEMPLARY EMBODIMENTS

In the block diagram of the inventive dominant sound source direction estimation processing depicted in FIG. 3, like in FIG. 1, the directional power distribution $\sigma^2(l)$ with respect to the dominant sound sources is computed from the time frame C(l) of HOA coefficients in a step or stage 31 for estimation of directional power distribution. However, the directions of the dominant sound sources $\hat{\Omega}_{DOM,d}(l)$, d=1, . . . , D, are not computed like in step/stage 12 in FIG. 1 directly from the directional power distribution $\sigma^2(l)$, but from a-posterior probability function $P^{POST}(l, \Omega_q)$ calculated in step/stage 32, which provides the posterior probability that any of the dominant sound sources is located at any test direction $\Omega_q$ at time frame l. The values of the posterior probability function for all test directions at a specific time frame l are summarized in the vector $P^{POST}(l)$ as follows:

$$P^{POST}(l) := [P^{POST}(l,\Omega_1) \ldots P^{POST}(l,\Omega_Q)]. \tag{5}$$

There is no explicit smoothing of the estimated directions $\hat{\Omega}_{DOM,d}(l)$, but rather an implicit smoothing which is performed in the computation of the posterior probability function. Advantageously, this implicit smoothing can be regarded as a smoothing with an adaptive smoothing constant, where the smoothing constant is automatically optimally chosen depending on a sound source movement model.

The a-posterior probability function $P^{POST}(l)$ is computed in step/stage 32 according to the Bayesian rule from the directional power distribution $\sigma^2(l)$ and from an a-priori probability function $P^{PRIO}(l,\Omega_q)$, which predicts depending on the knowledge at frame l−1 the probability that any of the dominant sound sources is located at any test direction $\Omega_q$ at time frame l.

The term "a-priori probability" denotes knowledge about the prior distribution (see e.g. http://en.wikipedia.org/wiki/A_priori_probability) and is well established in the context of Bayesian data analysis, see e.g. A. Gelman, J. B. Carlin, H. S. Stern, D. B. Rubin, "Texts in Statistical Science, Bayesian Data Analysis", Second Edition, Chapman&Hall/CRC, 29 Jul. 2003. In the context of this application it means the probability that any of the dominant sound sources is located at any test direction $\Omega_q$ at time frame l temporally before the observation of the l-th frame.

In the 'Bayesian inference' Bayes' rule is used for updating the probability estimate for a hypothesis as additional evidence is acquired, cf. http://en.wikipedia.org/wiki/Bayesian_inference.

The term "a-posteriori probability" denotes the conditional probability that is assigned after the relevant evidence is taken into account (see e.g. http://en.wikipedia.org/wiki/A_posteriori_probability) and is also well established in the context of Bayesian data analysis. In the context of the invention it means the posterior probability that any of the dominant sound sources is located at any test direction $\Omega_q$ at time frame l temporally after the observation of the l-th frame.

The values of the a-priori probability function for all test directions at a specific time frame l are calculated in step/stage 37 and are summarized in the vector $P^{PRIO}(l)$ as follows:

$$P^{PRIO}(l) := [P^{PRIO}(l,\Omega_1) \ldots P^{PRIO}(l,\Omega_Q)]. \quad (6)$$

Step/stage 37 receives as input signals matrix $A_{\hat{\Omega}}(l-1)$ from a frame delay 34 that gets matrix $A_{\hat{\Omega}}(l)$ as input from a step or stage 33 for search and assignment of dominant sound source directions, and gets vector $a_{\hat{\Theta}}(l-1)$ from a source movement angle estimation step or stage 36.

The a-priori probability function $P^{PRIO}(l, \Omega_q)$ computed in step/stage 37 is based on a simplified sound source movement prediction model calculated in step/stage 36, which requires estimates of the dominant sound source directions for the previous time frame l−1 of the HOA coefficients, i.e. $\hat{\Omega}_{DOM,d}(l-1)$, d=1, ..., D represented by matrix $A_{\hat{\Omega}}(l-1)$, as well as estimates of the angles $\hat{\Theta}_d(l-1)$, d=1, ..., D, of sound source movements from penultimate frame l−2 to previous frame l−1 of the HOA coefficients. These sound source movement angles are defined by $$\hat{\Theta}_d(l-1) := \angle(\hat{\Omega}_{DOM,d}(l-1),\hat{\Omega}_{DOM,d}(l-2)) \quad (7)$$

and are arranged in vector $a_{\hat{\Theta}}(l-1)$ as follows:

$$a_{\hat{\Theta}}(l-1) := [\hat{\Theta}_1(l-1) \ldots \hat{\Theta}_D(l-1)]^T. \quad (8)$$

The dominant sound source directions at time frame l−2, i.e. $\hat{\Omega}_{DOM,d}(l-2)$, d=1, ..., D are represented by matrix $A_{\hat{\Omega}}(l-2)$, which is received via frame delay 35 from the output of frame delay 34.

Source Movement Prediction Model

The source movement prediction model and the respective computation of the a-priori probability function calculated in step/stage 37 are determined as follows.

A statistical source movement prediction model is assumed. For simplifying the explanation of this model, the single source case is considered first, and the more relevant multi-source case is described afterwards.

Single-Source Case

It is assumed that only the d-th sound source denote by $s_d$ of a total of D sound sources is tracked. It is further assumed that an estimate $\hat{\Omega}_{DOM,d}(l-1)$ of its direction at time frame l−1 is available and additionally an estimate of its movement angle $\hat{\Theta}_d(l-1)$ covered between the time frames l−2 and l−1.

The predicted probability of the direction of $s_d$ at time frame l is assumed to be given by the following discrete von Mises-Fisher distribution (see the corresponding below section for a detailed explanation of that distribution):

$$P^{PRIO,SINGLE}_{\tilde{\Omega}_{DOM,d}(l)}(\Omega_q) := P_{\tilde{\Omega}_{DOM,d}(l)|\hat{\Omega}_{DOM,d}(l-1),\hat{\Theta}_d(l-1)}(\Omega_q) \quad (9)$$

$$:= \begin{cases} \frac{\kappa_d(l-1)}{Q \cdot \sinh(\kappa_d(l-1))} \cdot \exp\{\kappa_d(l-1) \cdot \cos(\Theta_{q,d})\} & \text{if } \kappa_d(l-1) \neq 0 \\ \frac{1}{Q} & \text{if } \kappa_d(l-1) = 0 \end{cases} \quad (10)$$

In equations (9) and (10), $\tilde{\Omega}_{DOM,d}(l)$ denotes the discrete random variable indicating the direction of the d-th source at the l-th time frame, which can only have the values $\Omega_q$, q=1, ..., Q. Hence, formally the right hand side expression in (9) denotes the probability with which the random variable $\tilde{\Omega}_{DOM,d}(l)$ assumes the value $\Omega_q$, given that the values $\hat{\Omega}_{DOM,d}(l-1)$ and $\hat{\Theta}_d(l-1)$ are known.

In equation (10), $\Theta_{q,d}$ denotes the angle distance between the estimated direction $\hat{\Omega}_{DOM,d}(l-1)$ and the test direction, which is expressed as follows:

$$\Theta_{q,d} := \angle(\Omega_q, \hat{\Omega}_{DOM,d}(l-1)). \quad (11)$$

The concentration of the distribution around the mean direction is determined by the concentration parameter $\kappa_d(l-1)$. The concentration parameter determines the shape of the von Mises-Fisher distribution. For $\kappa_d(l-1)=0$, the distribution is uniform on the sphere. The concentration increases with the value of $\kappa_d(l-1)$. For $\kappa_d(l-1)>0$, the distribution is uni-modal and circular symmetric, and centred about the mean direction $\hat{\Omega}_{DOM,d}(l-1)$. The variable $\kappa_d(l-1)$ can be computed from the movement angle estimate $\hat{\Theta}_d(l-1)$. An example for such computation is presented below.

The a-priori probability function $P^{PRIO,SINGLE}_{\tilde{\Omega}_{DOM,d}}(\Omega_q)$ satisfies $$\Sigma_{q=1}^{Q} P^{PRIO,SINGLE}_{\tilde{\Omega}_{DOM,d}}(\Omega_q) = 1. \quad (12)$$

Computation of Concentration Parameter

One way of computing the concentration parameter is postulating that the ratio of the values of the a-priori probability evaluated at $\hat{\Omega}_{DOM,d}(l-2)$ and $\hat{\Omega}_{DOM,d}(l-1)$ is satisfying a constant value $C_R$:

$$\frac{P^{PRIO,SINGLE}_{\tilde{\Omega}_{DOM,d}(l)}(\hat{\Omega}_{DOM,d}(l-2))}{P^{PRIO,SINGLE}_{\tilde{\Omega}_{DOM,d}(l)}(\hat{\Omega}_{DOM,d}(l-1))} \stackrel{!}{=} C_R, \quad (13)$$

where $0 < C_R < 1$ because the a-priori probability has its maximum at $\hat{\Omega}_{DOM,d}(l-1)$. By using equations (10) and (7), equation (13) can be reformulated:

$$\exp\{\kappa_d(l-1)[\cos(\hat{\Theta}_d(l-1))-1]\} \stackrel{!}{=} C_R, \quad (14)$$

which provides the desired expression for the concentration parameter $$\kappa_d(l-1) = \frac{\ln(C_R)}{\cos(\hat{\Theta}_d(l-1))-1}. \quad (15)$$

The principle behind this computation is to increase the concentration of the a-priori probability function the less the sound source has moved before. If the sound source has moved significantly before, the uncertainty about its successive direction is high and thus the concentration parameter shall get a small value.

In order to avoid the concentration becoming too high (especially becoming infinitely large for $\hat{\Theta}_d(l-1)=0$), it is reasonable to replace equation (15) by $$\kappa_d(l-1) = \frac{\ln(C_R)}{\cos(\hat{\Theta}_d(l-1)) - 1 - C_D}, \quad (16)$$

where $C_D$ may be set to $$C_D = \frac{\ln(C_R)}{-\kappa_{MAX}} \quad (17)$$

in order to obtain a maximum value $\kappa_{MAX}$ of the concentration parameter for a source movement angle of zero. The following values have been experimentally found to be reasonable:

$$\kappa_{MAX}=8 \; C_R=0.5. \quad (18)$$

In any case, $\kappa_{MAX}>0$, and $0<C_R<1$ as mentioned above. The resulting relationship between the concentration parameter $\kappa_d(l-1)$ and the source movement angle $\hat{\Theta}_d(l-1)$ is shown in FIG. 4.

Multi-Source Case

Now it is assumed that the aim is tracking D dominant sound sources $s_d$, $d=1, \ldots, D$ with directions independent of each other. If it is further assumed that, according to the considerations in the single-source case section, the probability of the d-th sound source being located at direction $\Omega_q$ in the l-th time frame is given by $P_{\hat{\Omega}_{DOM,d}}^{PRIO,SINGLE}(\Omega_q)$, and it can be concluded that the probability of no sound source being located at direction $\Omega_q$ in the l-th time frame must be $$\pi_{d=1}^{D}[1-P_{\hat{\Omega}_{DOM,d}}^{PRIO,SINGLE}(\Omega_q)]. \quad (19)$$

Hence, the probability $P_{PRIO}(l, \Omega_q)$ of any one of the D sound sources being located at direction $\Omega_q$ in the l-th time frame is given by $$P^{PRIO}(l,\Omega_q)=1-\pi_{d=1}^{D}[1-P_{\hat{\Omega}_{DOM,d}}^{PRIO,SINGLE}(\Omega_q)]. \quad (20)$$

Bayesian Learning

Regarding the processing in step/stage 32, Bayesian learning is a general method of inferring posterior information about a quantity from a-priori knowledge, in form of a probability function or distribution and a current observation that is related to the desired quantity and thus provides a likelihood function.

In this special case of tracking dominant sound source directions, the likelihood function is given by the directional power distribution $\sigma^2(l)$. The a-priori probability function $P^{PRIO}(l,\Omega_q)$ is obtained from the sound source movement model described in section SOURCE MOVEMENT PREDICTION MODEL and is given by equation (20).

According to the Bayesian rule, the a-posteriori probability of any of the D sound sources being located at direction $\Omega_q$ in the l-th time frame is given by $$P^{POST}(l, \Omega_q) = \frac{P^{PRIO}(l, \Omega_q) \cdot \sigma^2(l, \Omega_q)}{\sum_{q=1}^{Q} P^{PRIO}(l, \Omega_q) \cdot \sigma^2(l, \Omega_q)} \quad (21)$$

$$\propto P^{PRIO}(l, \Omega_q) \cdot \sigma^2(l, \Omega_q), \quad (22)$$

where $\propto$ means 'proportional to'.

In equation (21) the fact is exploited that its denominator does not depend on the test direction $\Omega_q$.

Instead of the bare directional power distribution $\sigma^2(l)$, now the posterior probability function $P^{POST}(l, \Omega_q)$ can be used for the search of the directions of the dominant sound sources in step/stage 33, which in addition receives matrix $A_{\hat{\Omega}}(l-1)$ and which outputs matrix $A_{\hat{\Omega}}(l)$. That search is more stable because it applies an implicit smoothing onto the directional power distribution. Advantageously, such implicit smoothing can be regarded as a smoothing with adaptive smoothing constant, which feature is optimal with respect to the assumed sound source model.

The following section provides a more detailed description of the individual processing blocks for the estimation of the dominant sound source directions.

Estimation of Directional Power Distribution

The directional power distribution $\sigma^2(l)$ for the l-th time frame and a predefined number Q of test directions $\Omega_q$, $q=1, \ldots, Q$, which are nearly uniformly distributed on the unit sphere, is estimated in step/stage 31 from the time frame $C(l)$ of HOA coefficients. For this purpose the method described in EP 12305537.8 can be used.

Computation of a-Posteriori Probability Function for Dominant Source Directions

The values $P^{POST}(l, \Omega_q)$, $q=1, \ldots, Q$, of the a-posteriori probability function $P^{POST}(l)$ are computed in step/stage 32 according to equation (21), using the values $P^{PRIO}(l, \Omega_q)$, $q=1, \ldots, Q$, of the a-priori probability function $P^{PRIO}(l)$ and the values $\sigma^2(l, \Omega_q)$, $q=1, \ldots, Q$, of the directional power distribution $\sigma^2(l)$:

$$P^{POST}(l, \Omega_q) = \frac{P^{PRIO}(l, \Omega_q) \cdot \sigma^2(l, \Omega_q)}{\sum_{q=1}^{Q} P^{PRIO}(l, \Omega_q) \cdot \sigma^2(l, \Omega_q)}.$$

Computation of a-Priori Probability Function for Dominant Source Directions

The values $P^{PRIO}(l, \Omega_q)$, $q=1, \ldots, Q$, of the a-priori probability function $P^{PRIO}(l)$ are computed in step/stage 37 from the dominant sound source directions $\hat{\Omega}_{DOM,d}(l-1)$, $d=1, \ldots, D$, in the (l-1)-th time frame, which are contained in the matrix $A_{\hat{\Omega}}(l-1)$, and from the dominant sound source movement angles $\hat{\Theta}_d(l-1)$, $d=1, \ldots, D$, which are contained in the vector $a_{\hat{\Theta}}(l-1)$, according to equation (20) as $$P^{PRIO}(l,\Omega_q)=1-\pi_{d=1}^{D}[-P_{\hat{\Omega}_{DOM,d}}^{PRIO,SINGLE}(\Omega_q)],$$

where $P_{\hat{\Omega}_{DOM,d}}^{PRIO,SINGLE}(\Omega_q)$ is computed according to equation (10) as $$P_{\hat{\Omega}_{DOM,d}(l)}^{PRIO,SINGLE}(\Omega_q) =$$

$$\begin{cases} \dfrac{\kappa_d(l-1)}{O \cdot \sinh(\kappa_d(l-1))} \cdot \exp\{\kappa_d(l-1) \cdot \cos(\theta_{q,d})\} & \text{if } \kappa_d(l-1) \neq 0 \\ \dfrac{1}{O} & \text{if } \kappa_d(l-1) = 0 \end{cases}.$$

with $\Theta_{q,d} := \angle(\Omega_q, \hat{\Omega}_{DOM,d})(l-1))$.

The concentration parameters $\kappa_d(l-1)$ of the individual probability functions $P_{\hat{\Omega}_{DOM,d}}^{PRIO,SINGLE}(\Omega_q)$ are obtained as $$\kappa_d(l-1) = \frac{\ln(C_R)}{\cos(\hat{\theta}_d(l-1)) - 1 - C_D},$$

where $C_D$ is set to $$C_D = \frac{\ln(C_R)}{-\kappa_{MAX}}$$

with $\kappa_{MAX}=8$ and $C_R=0.5$.

Concerning the initialisation of the concentration parameter, it should be noted that for the first two frames, i.e. l=1 and l=2, the source movement angle estimates $\hat{\Theta}_d(0)$ and $\hat{\Theta}_d(1)$ are not yet available. For these first two frames, the concentration parameter is set to zero, i.e., $\kappa_d(0)=\kappa_d(1)=0$ for all d=1, . . . , D, thereby assuming a uniform a-priori probability distribution for all dominant directions.

Source Movement Angle Estimation

The movement angles $\hat{\Theta}_d(l-1)$, d=1, . . . , D, of the dominant sound sources, which are contained in the vector $a_{\Theta}(l-1)$, are computed according to equation (7) by $$\hat{\Theta}_d(l-1):=\angle(\Omega_{DOM,d}(l-1),\hat{\Omega}_{DOM,d}(l-2)).$$

Search and Assignment of Dominant Sound Source Directions

In step/stage 36, the current dominant directions $\hat{\Omega}_{CURRDOM,d}(l)$, d=1, . . . , D, are searched in a first step and are then assigned to the appropriate sources, i.e. to the directions found in the previous frame $\hat{\Omega}_{DOM,d}(l-1)$, d=1, . . . , D.

Search of Directions

In step/stage 37, the search of the dominant sound source direction is depending on the a-posteriori probability function $P^{POST}(l)$, not on the directional power distribution $\sigma^2(l)$. As an example, the direction search method described in EP 12305537.8 can be used. This processing assumes that the dominant sound source directions are pair-wise separated by at least an angle distance of $\Theta_{MIN}:=\pi/N$, where N denotes the order of the HOA representation. This assumption origins from the spatial dispersion of directional signals resulting from a spatial band limitation due to a bounded HOA representation order. According to EP 12305537.8, the first dominant direction $\hat{\Omega}_{CURRDOM,1}(l)$ is set to that with the maximum value of the a-posteriori probability function $P^{POST}(l)$, i.e.

$$\hat{\Omega}_{CURRDOM,1}(l)=\Omega_{q_1} \text{ with } q_1:=\text{argmax}_{q\in\mathcal{M}_1} \mathcal{M}_1 \text{ and}$$
$$\mathcal{M}_1:=\{1,\ldots,Q\}. \quad (23)$$

For the search of the second dominant direction $\hat{\Omega}_{CURRDOM,2}(l)$ all test directions $\Omega_q$ in the neighbourhood of $\hat{\Omega}_{CURRDOM,1}(l)$ with $\angle(\Omega_q,\hat{\Omega}_{CURRDOM,1}(l))\leq\Theta_{MIN}$ are excluded. Then, the second dominant direction $\hat{\Omega}_{CURRDOM,2}(l)$ is set to that with the maximum power in the remaining direction set $$\mathcal{M}_2:=\{q\in\mathcal{M}_1 \mid \angle(\Omega_q,\hat{\Omega}_{CURRDOM,1}(l))>\Theta_{MIN}\}. \quad (24)$$

The remaining dominant directions are determined in an analogous way.

The overall procedure for the computation of all dominant directions is summarised by the following program:

Algorithm 1
Search of dominant directions based on the a posteriori probability function d = 1

$\mathcal{M}_1 = \{1, 2, \ldots, Q\}$ repeat $q_d = \underset{q\in\mathcal{M}_d}{\text{argmax}} P^{POST}(l, \Omega_q)$ $\hat{\Omega}_{CURRDOM,d}(l) = \Omega_{q_d}$ $\mathcal{M}_{d+1} = \{q \in \mathcal{M}_d \mid \angle(\Omega_q, \Omega_{q_d}) > \theta_{MIN}\}$ until d > D Assignment of Directions After having found all current dominant sound source directions $\hat{\Omega}_{CURRDOM,d}(l)$, d=1, . . . , D, these directions are assigned in step/stage 33 to the dominant sound source directions $\hat{\Omega}_{DOM,d}(l-1)$, d=1, . . . , D from the previous frame (l-1) contained in matrix $A_{\hat{\Omega}}(l-1)$. The assignment function $f_{\mathcal{A},l}: \{1,\ldots,D\}\to\{1,\ldots,D\}$ is determined such that the sum of angles between assigned directions $$\sum_{d=1}^{D} <(\hat{\Omega}_{CURRDOM,d}(l), \hat{\Omega}_{DOM,f_{\mathcal{A},l}(d)}(l-1)) \quad (25)$$

is minimised. Such an assignment problem can be solved using the Hungarian algorithm described in H. W. Kuhn, "The Hungarian method for the assignment problem", Naval research logistics quarterly, vol. 2, pp. 83-97, 1955.

Following computation of the assignment function, the directions $\hat{\Omega}_{DOM,d}(l)$, d=1, . . . , D and the corresponding output matrix $A_{\hat{\Omega}}(l)$ according to equation (4) are obtained by $$\hat{\Omega}_{DOM,(d)}(l) := \hat{\Omega}_{CURRDOM,f_{\mathcal{A},l}^{-1}(d)}(l) \text{ for } d = 1, \ldots, D, \quad (26)$$

where $f_{\mathcal{A},l}^{-1}(\cdot)$ denotes the inverse assignment function.

It should be noted that for the first time frame, i.e. l=1, the estimates of the dominant sound source directions from the previous time frame are not yet available. For this frame the assignment should not be based on the direction estimates from the previous frames, but instead can be chosen arbitrary. I.e., in an initialization phase the direction estimates of the dominant sound source directions are chosen arbitrarily for a non-available previous time frame of said HOA coefficients (C(l)).

Regarding equations (9) and (10), the von Mises-Fisher distribution on the unit sphere $S^2:=\{x\in\mathbb{R}^3\mid\|x\|=1\}$ in the three-dimensional Euclidean space $\mathbb{R}^3$ is defined by:

$$f_{MF,\kappa,x_0}(x) := \frac{\kappa}{4\pi\cdot\sinh(\kappa)}\exp\{\kappa\cdot x_0^T x\} \text{ for } x \in S^2. \quad (27)$$

where $(\cdot)^T$ denotes transposition, $\kappa\geq 0$ is called the concentration parameter and $x_0\in\mathbb{R}^3$ is called the mean direction, see e.g. Kwang-Il Seon, "Smoothing of an All-sky Survey Map with a Fisher-von Mises Function", J. Korean Phys. Soc., 2007).

For κ=0, the distribution is uniform on the sphere because $$\lim_{\kappa \to 0} f_{MF,\kappa,x_0}(x) = \frac{1}{4\pi}. \tag{28}$$

For κ>0, the distribution is uni-modal and circular symmetric, centred around the mean direction $x_0$. The concentration of the distribution around the mean direction is determined by the concentration parameter κ. In particular, the concentration increases with the value of κ. Because each vector $x \in S^2$ has unit modulus, it can be uniquely represented by the direction vector $$\Omega := (\theta, \phi)^T \tag{29}$$

containing an inclination angle $\theta \in [0,\pi]$ and an azimuth angle $\phi \in [0,2\pi]$ of a spherical coordinate system. Hence, by considering the identity $$x_0^T x = \cos(\angle(x_0, x)), \tag{30}$$

where $\angle(x_0, x)$ denotes the angle between $x_0$ and $x$, the von Mises-Fisher distribution can be formulated in an equivalent manner as $$f_{MF,Sphere,\kappa,x_0}(\Omega) := \frac{\kappa}{4\pi \cdot \sinh(\kappa)} \exp\{\kappa \cdot \cos(\angle(\Omega, \Omega_0))\} \tag{31}$$

with $\Omega_0$ representing $x_0$. In the special case where the mean direction points into the direction of the z-axis, i.e. $\theta_0 = 0$, the von Mises-Fisher distribution is symmetrical with respect to the z-axis and depends on the inclination angle $\theta$ only:

$$f_{MF,Sphere,\kappa}(\theta) := f_{MF,Sphere,\kappa,x_0}(\Omega)|_{\theta_0=0} = \frac{\kappa}{4\pi \cdot \sinh(\kappa)} \exp\{\kappa \cdot \cos(\theta)\}. \tag{32}$$

The shape of the von Mises-Fisher distribution $f_{MF,Sphere,\kappa}$ vs θ around the mean direction is illustrated in FIG. 5 for different values of the concentration parameter κ.

Obviously, the von Mises-Fisher distribution satisfies the condition $$\int_{S^2} f_{MF,Sphere,\kappa,x_0}(\Omega) d\Omega = 1. \tag{33}$$

This can be seen from $$\int_{S^2} f_{MF,Sphere,\kappa,x_0}(\Omega)\Big|_{\theta_0=0} d\Omega = 2\pi \int_0^\pi f_{MF,Sphere,\kappa}(\theta) \sin(\theta) d\theta \tag{34}$$

$$= \frac{\kappa}{2 \cdot \sinh(\kappa)} \int_{-1}^1 \exp\{\kappa z\} dz \tag{35}$$

$$= 1, \tag{36}$$

i.e. the integral of functions over the sphere is invariant with respect to rotations.

A discrete probability function $f_{MF,DISC,Sphere,\kappa,x_0}(\Omega_q)$ having the shape of the von Mises-Fisher distribution $f_{MF,Sphere,\kappa,x_0}(\Omega)$ can be obtained by spatially sampling the sphere using a number of Q discrete sampling positions (or synonymous sampling directions) $\Omega_q$, q=1, ..., Q, which are approximately uniformly distributed on the unit sphere $S^2$. For assuring the appropriate scaling of $f_{MF,DISC,Sphere,\kappa,x_0}(\Omega_q)$ in order to satisfy the property $$\Sigma_{q=1}^Q f_{MF,DISC,Sphere,\kappa,x_0}(\Omega_q) \stackrel{!}{=} 1 \tag{37}$$

of a probability function, the numerical approximation of the integral of $f_{MF,Sphere,\kappa,x_0}(\Omega)$ over the sphere $$1 = \int_{S^2} f_{MF,Sphere,\kappa,x_0}(\Omega) d\Omega \approx \Sigma_{q=1}^Q f_{MF,Sphere,\kappa,x_0}(\Omega_q) \Delta\Omega \tag{38}$$

is considered, where $$\Delta\Omega = \frac{4\pi}{Q}$$

is the surface area assigned to each spatial sampling direction. Note that the surface area does not depend on the sampling direction $\Omega_q$ because a nearly uniform sampling was assumed. By comparing equation (38) with equation (37), the desired solution is finally found to be $$f_{MF,DISC,Sphere,\kappa,x_0}(\Omega_q) = \Delta\Omega \cdot f_{MF,Sphere,\kappa,x_0}(\Omega_q) \tag{39}$$

$$= \frac{\kappa}{Q \cdot \sinh(\kappa)} \exp\{\kappa \cdot \cos(\angle(\Omega_q, \Omega_0))\} \tag{40}$$

$$q = 1, \ldots, Q,$$

where in the last step equation (31) is substituted.

The inventive processing can be carried out by a single processor or electronic circuit, or by several processors or electronic circuits operating in parallel and/or operating on different parts of the inventive processing.

The invention can be applied e.g. for the compression of three-dimensional sound fields represented by HOA, which can be rendered or played on a loudspeaker arrangement in a home environment or on a loudspeaker arrangement in a cinema.

The invention claimed is:

1. A method for determining dominant sound source directions in a Higher Order Ambisonics representation denoted HOA of a sound field, said method comprising:
   from a current time frame of HOA coefficients, estimating a directional power distribution with respect to dominant sound sources;
   from said directional power distribution and from an a-priori probability function for dominant sound source directions, computing an a-posteriori probability function for said dominant sound source directions;
   depending on said a-posteriori probability function and on dominant sound source directions for the previous time frame of said HOA coefficients, searching and assigning dominant sound source directions for said current time frame of said HOA coefficients,
   wherein said a-priori probability function is computed from a set of estimated sound source movement angles and from said dominant sound source directions for the previous time frame of said HOA coefficients, and wherein said set of estimated sound source movement angles is computed from said dominant sound source directions for the previous time frame of said HOA coefficients and from dominant sound source directions for the penultimate time frame of said HOA coefficients.

2. The method according to claim 1, further comprising:
   computing said a-posterior probability function according to the Bayesian rule, wherein said a-priori probability function predicts, depending on the knowledge at said previous time frame of said HOA coefficients, the probability that any of the dominant sound sources is located at any test direction at said current time frame of HOA coefficients.

3. The method according to claim 1, further comprising: calculating said a-priori probability function according to $P^{PRIO}(l,\Omega_q)=1-\Pi_{d=1}^{D}[1-P_{\hat{\Omega}_{DOM,d}(l)}^{PRIO,SINGLE}(\Omega_q)]$ and determining the probability of any one of D sound sources being located at direction $\Omega_q$ in said current time frame l of HOA coefficients,
wherein $$P_{\hat{\Omega}_{DOM,d}(l)}^{PRIO,SINGLE}(\Omega_q) = \begin{cases} \frac{\kappa_d(l-1)}{Q \cdot \sinh(\kappa_d(l-1))} \cdot \exp\{\kappa_d(l-1) \cdot \cos(\theta_{q,d})\} & \text{if } \kappa_d(l-1) \neq 0 \\ \frac{1}{Q} & \text{if } \kappa_d(l-1) = 0. \end{cases}$$

$\hat{\Omega}_{DOM,d}(l)$ denotes a discrete random variable indicating the direction of the d-th source at the l-th time frame and has values $\Omega_q$, q=1, ... Q, $\kappa_d(l-1)$ is a concentration parameter determining the shape of a von Mises-Fisher distribution around the mean direction, $\theta_{q,d}$ denotes the angle distance between an estimated direction $\hat{\Omega}_{DOM,d}(l-1)$ and a test direction.

4. The method according to claim 2, further comprising: computing said a-posterior probability function according to:

$$P^{POST}(l,\Omega_q) = \frac{P^{PRIO}(l,\Omega_q) \cdot \sigma^2(l,\Omega_q)}{\sum_{q=1}^{Q} P^{PRIO}(l,\Omega_q) \cdot \sigma^2(l,\Omega_q)},$$

wherein $\sigma^2(l)$ is said directional power distribution.

5. The method according to claim 1, further comprising carrying out said assigning of dominant sound source directions for said current time frame l of said HOA coefficients by:
following determining of all current dominant sound source directions $\hat{\Omega}_{CURRDOM,d}(l)$, d=1, ... D, assigning these directions to the dominant sound source directions $\hat{\Omega}_{DOM,d}(l-1)$, d=1, ..., D from the previous frame, wherein the assignment function $f_{\mathcal{A},l}:\{1, ... D\} \to \{1, ..., D\}$ is determined such that the sum of angles $$\sum_{d=1}^{D} \sphericalangle(\hat{\Omega}_{CURRDOM,d}(l), \hat{\Omega}_{DOM,f_{\mathcal{A},l}(d)}(l-1))$$

between assigned directions is minimised;
obtaining said dominant sound source directions by $$\hat{\Omega}_{DOM,(d)}(l) := \hat{\Omega}_{CURRDOM,f_{\mathcal{A},l}^{-1}(d)}(l) \text{ for } d = 1, ... , D,$$

where $f_{\mathcal{A},l}^{-1}(\cdot)$ denotes the inverse assignment function.

6. The method according to claim 3, further comprising: setting for an initialisation of said concentration parameter for the first two time frames (l=1, l=2) of said HOA coefficients said concentration parameter to zero by $\kappa_d(0)=\kappa_d(1)=0$ for all d=1, ..., D.

7. The method according to claim 1, further comprising: choosing arbitrarily for an initialisation, for a non-available previous time frame of said HOA coefficients, the direction estimates of said dominant sound source directions.

8. An apparatus for determining dominant sound source directions in a Higher Order Ambisonics representation denoted HOA of a sound field, said apparatus comprising a processor configured to:
estimating from a current time frame of HOA coefficients a directional power distribution with respect to dominant sound sources;
computing from said directional power distribution and from an a-priori probability function for dominant sound source directions an a-posteriori probability function for said dominant sound source directions;
searching and assigning, depending on said a-posteriori probability function and on dominant sound source directions for the previous time frame of said HOA coefficients, dominant sound source directions for said current time frame of said HOA coefficients;
computing said a-priori probability function from a set of estimated sound source movement angles and from said dominant sound source directions for the previous time frame of said HOA coefficients;
computing said set of estimated sound source movement angles from said dominant sound source directions for the previous time frame of said HOA coefficients and from dominant sound source directions for the penultimate time frame of said HOA coefficients.

9. The apparatus according to claim 8, wherein said a-posterior probability function is computed according to the Bayesian rule, and wherein said a-priori probability function predicts, depending on the knowledge at said previous time frame of said HOA coefficients, the probability that any of the dominant sound sources is located at any test direction at said current time frame of HOA coefficients.

10. The apparatus according to claim 8, wherein said a-priori probability function is calculated according to $P^{PRIO}(l,\Omega_q)=1-\Pi_{d=1}^{D}[1-P_{\hat{\Omega}_{DOM,d}(l)}^{PRIO,SINGLE}(\Omega_q)]$ and determines the probability of any one of D sound sources being located at direction $\Omega_q$ in said current time frame l of HOA coefficients,
and wherein $$P_{\hat{\Omega}_{DOM,d}(l)}^{PRIO,SINGLE}(\Omega_q) = \begin{cases} \frac{\kappa_d(l-1)}{Q \cdot \sinh(\kappa_d(l-1))} \cdot \exp\{\kappa_d(l-1) \cdot \cos(\theta_{q,d})\} & \text{if } \kappa_d(l-1) \neq 0 \\ \frac{1}{Q} & \text{if } \kappa_d(l-1) = 0. \end{cases}$$

$\tilde{\Omega}_{DOM,d}(l)$ denotes a discrete random variable indicating the direction of the d-th source at the l-th time frame and has values $\Omega_q$, q=1, ..., Q, $\kappa_d(l-1)$ is a concentration parameter determining the shape of a von Mises-Fisher distribution around the mean direction, $\theta_{q,d}$ denotes the angle distance between an estimated direction $\hat{\Omega}_{DOM,d}(l-1)$ and a test direction.

11. The apparatus according to claim 9, wherein said a-posterior probability function is computed according to:

$$P^{POST}(l, \Omega_q) = \frac{P^{PRIO}(l, \Omega_q) \cdot \sigma^2(l, \Omega_q)}{\sum_{q=1}^{Q} P^{PRIO}(l, \Omega_q) \cdot \sigma^2(l, \Omega_q)},$$

wherein $\sigma^2(l)$ is said directional power distribution.

12. The apparatus according to claim 8, wherein said assigning of dominant sound source directions for said current time frame of said HOA coefficients is carried out by:
following determining of all current dominant sound source directions $\hat{\Omega}_{CURRDOM,d}(l)$, d=1, ..., D, assigning these directions to the dominant sound source directions $\Omega_{DOM,d}(l-1)$, d=1, ..., D from the previous frame, wherein the assignment function $f_{\mathcal{A},l}^{1}:\{1, ..., D\} \to \{1, ..., D\}$ is determined such that the sum of angles $$\sum_{d=1}^{D} \sphericalangle (\hat{\Omega}_{CURRDOM,d}(l), \hat{\Omega}_{DOM,f_{\mathcal{A},1}(d)}(l-1))$$

between assigned directions is minimised;
obtaining said dominant sound source directions by $$\hat{\Omega}_{DOM,(d)}(l) := \hat{\Omega}_{CURRDOM,f_{\mathcal{A},l}^{-1}(d)}(l) \text{ for } d = 1, ..., D,$$

where $f_{\mathcal{A},l}^{1}(\bullet)$ denotes the inverse assignment function.

13. The apparatus according to claim 10, wherein for an initialisation of said concentration parameter for the first two time frames of said HOA coefficients said concentration parameter is set to zero by $\kappa_d(0)=\kappa_d(1)=0$ for all d=1, ..., D.

14. The apparatus according to claim 8 wherein, for an initialisation, for a non-available previous time frame of said HOA coefficients the direction estimates of said dominant sound source directions are chosen arbitrarily.

* * * * *